United States Patent
Lin

(10) Patent No.: US 6,299,117 B1
(45) Date of Patent: Oct. 9, 2001

(54) CLAMPING DEVICE

(76) Inventor: Chin-Chih Lin, 3F, No. 128, Cha-Zhuang 1st Street, Kuei Shan, Taoyuan Hsien (TW)

(*) Notice: Subject to any disclaimer, the term of this patent is extended or adjusted under 35 U.S.C. 154(b) by 0 days.

(21) Appl. No.: 09/410,050

(22) Filed: Oct. 1, 1999

(51) Int. Cl.⁷ ................................................. A47G 29/02
(52) U.S. Cl. ............................ 248/316.1; 248/228.6; 248/230.6; 248/231.71; 248/226.11; 24/135 R; 24/525
(58) Field of Search ............................ 248/226.11, 689, 248/228.6, 230.6, 231.71, 316.1, 918; 24/135 R, 525

(56) References Cited

U.S. PATENT DOCUMENTS

| | | | |
|---|---|---|---|
| D. 278,913 | * 5/1985 | Hanke | D16/45 |
| D. 332,562 | * 1/1993 | Fremont et al. | D8/73 |
| D. 389,334 | * 1/1998 | Attridge | D6/418 |
| 2,399,714 | * 5/1946 | Wasilewski | 144/304 |
| 3,424,419 | * 1/1969 | Siegel | 248/226 |
| 4,846,803 | * 7/1989 | Emerson | 604/263 |

* cited by examiner

*Primary Examiner*—Leslie A. Braun
*Assistant Examiner*—Steven Marsh
(74) *Attorney, Agent, or Firm*—Dougherty & Troxell

(57) ABSTRACT

An improved clamping device includes a clamping body, a clamp bolt, and a clamping plate. The clamping body has an open lower portion and a top plate at an upper portion. The top plate is formed with a top hole, a depression being formed at an outer periphery of the top hole and being provided with at least two depression holes. The clamping bolt has a clamping rod connected to a bolt plate. The bolt plate has an outwardly projecting bolt post. The clamping rod has an outer diameter smaller than an inner diameter of the top hole and is provided with threads. The bolt plate is sized to match the depression and provided with bolt holes corresponding to the depression holes. The clamping plate includes a bottom clamping portion, a top clamping portion, and a clamping wall, each of which is bent in a right-angle. The top clamping portion has a through hole sized to match the clamping rod and is provided with threads corresponding to those of the clamping rod. The clamping rod passes through the top hole. Screws pass through the depression holes and the bolt holes for screwable engagement, so that the clamping body can be rotated to permit adjustment of a distance between an end portion of the clamping body and the bottom clamping portion to adapt to thickness of different clamped objects.

3 Claims, 3 Drawing Sheets

CLAMPING DEVICE

BACKGROUND OF THE INVENTION (a) Field of the Invention

The present invention relates to a clamping device, more particularly to a clamping device that will not project from the clamped surface and that can clamp objects of different thickness in a convenient manner.

(b) Description of the Prior Art

As clamping device can clamp an object while supporting an article placed thereon, it is widely adapted in everyday life. For instances, it can be adapted for use in lighting fixtures, copyholders, telephone holders, etc.

To make the most use of available spaces, such as desk surfaces, clamping devices are often used to suspend necessary articles or accessories in offices or homes.

Take lighting fixtures as an example. A desk lamp is provided with a clamp having one end that can be secured to the edge of a desk with the other end connected to the lamp so that the desk lamp can be located above the desk.

Take clamps for telephones as an example. The clamp can abut tightly to the desk surface by means of a rotary rod. However, the knob of the rotary rod or the clamp itself may project from the desk, which may, which the user rests against the desk, scratch the user's clothing, such as stockings.

SUMMARY OF THE INVENTION

A primary object of the present invention is to provide a clamping device that will not project from the object clamped and that can adapt to clamp objects of different thickness in a convenient manner.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
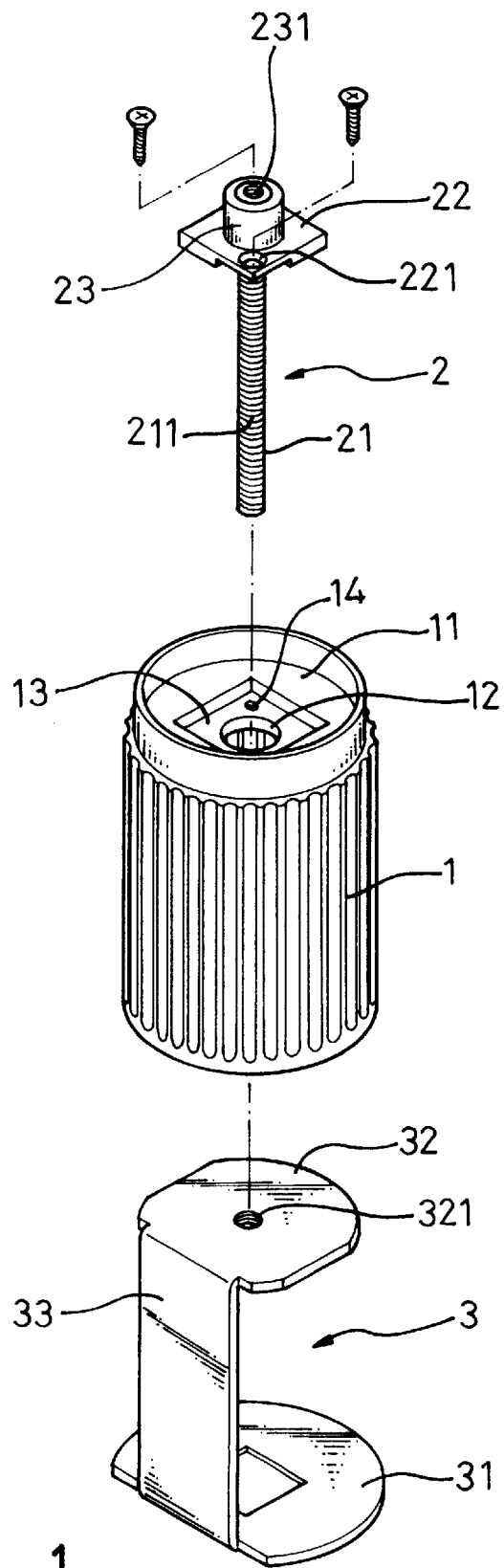
FIG. 1 is an exploded perspective view of a preferred embodiment of the present invention.
Figure 2:
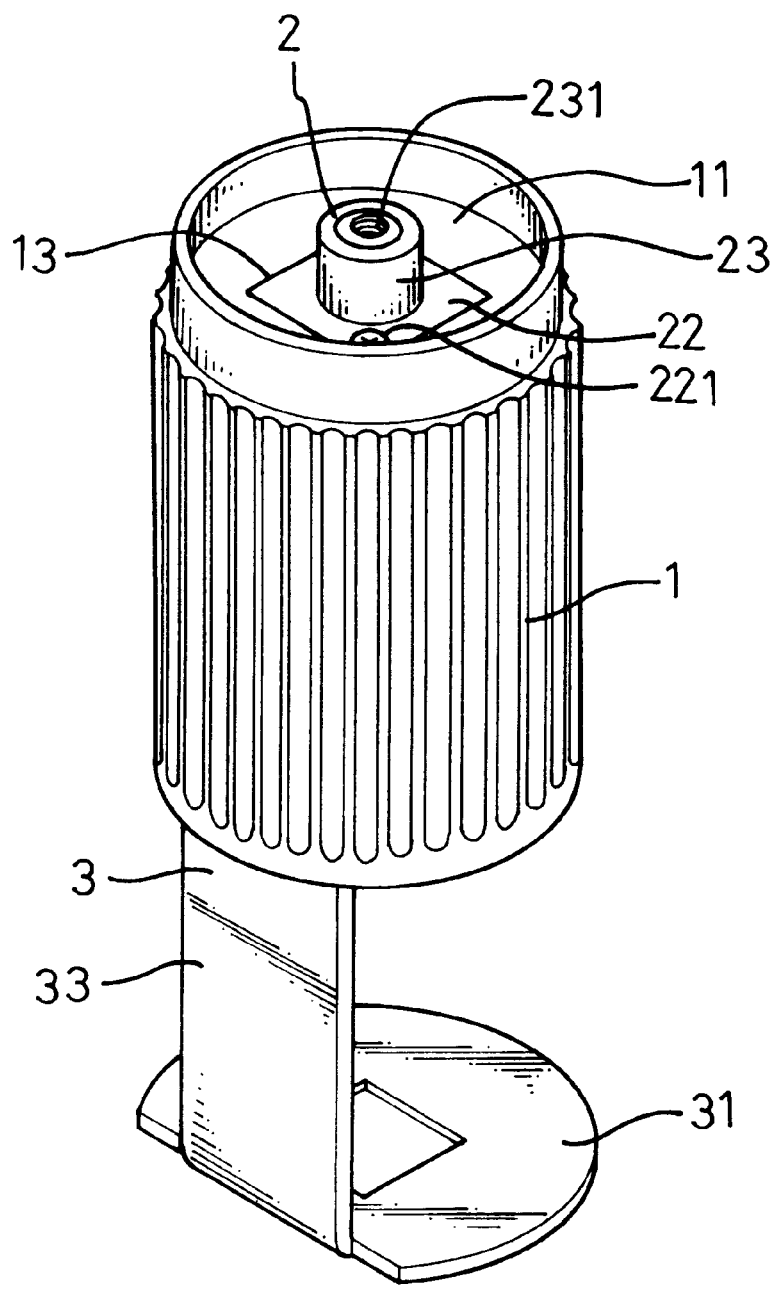
FIG. 2 is an assembled perspective view of the preferred embodiment.
Figure 3:
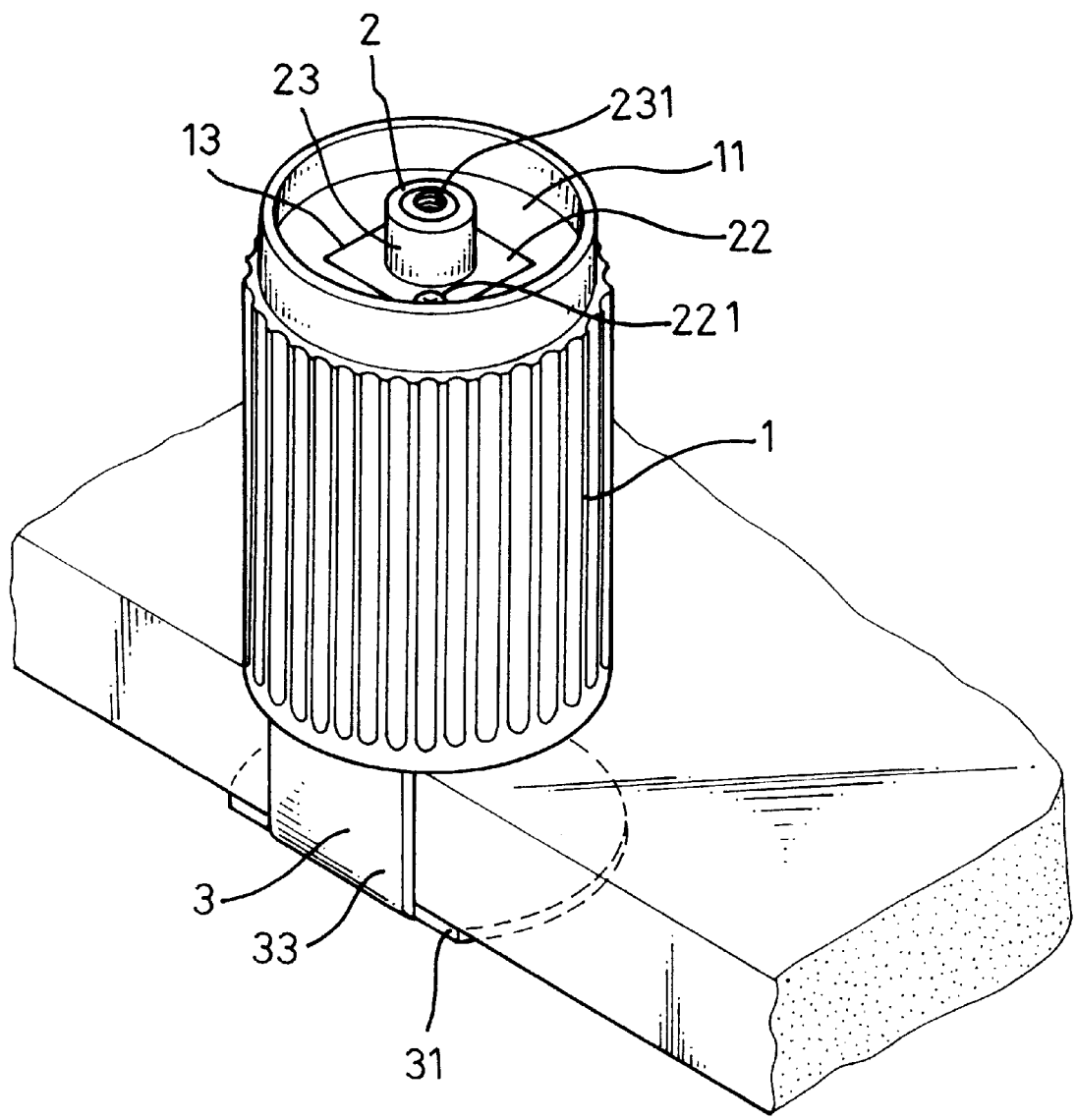
FIG. 3 is a schematic view of the preferred embodiment in a clamping state.

With reference to FIGS. 1 to 3, the preferred embodiment of a clamping device according to the present invention is shown to include a clamping body 1, a clamping bolt 2, and a clamping plate 3.

The clamping body 1 has an open lower portion. In this preferred embodiment, the clamping body 1 is cylindrical. But it may be configured to be rectangular, semi-cylindrical or have any other desirable shape. The clamping body 1 has a top plate 11 at an upper end. The top plate 11 is centrally formed with a top hole 12 for passage of the clamping bolt 2. In order to secure the clamping bolt 2 in position, a depression 13 is on an outer periphery of the top hole 12, and at least two depression holes 14 are provided for screwable engagement and positioning of the clamping bolt 2. Additionally, in order to facilitate application of force during adjustment of the clamping device of the invention, an outer peripheral wall of the clamping body 1 may be provided with toothed portions.

The clamping bolt 2 is essentially comprised of a clamping rod 21 connected to a bolt plate 22. The bolt plate 22 has an outwardly projecting bolt post 23. The outer diameter of the clamping rod 21 is smaller than the inner diameter of the top hole 12 and is provided with threads 211 for screwable engagement with the clamping plate 3. The bolt plate 22 is sized to match the depression 13 so that it can be fitted therein. The bolt plate 22 is also provided with bolt holes 221 corresponding to the depression holes 14 for passage of screws so that the clamping bolt 2 can be secured with the clamping body 1. In this embodiment, the depression 13 and the bolt plate 22 are shown to be square-shaped, but they may be configured to have any other suitable shapes. The bolt post 23 extends upwardly from the bolt plate 22. In this embodiment, the bolt post 23 is cylindrical and is centrally formed with a post hole 231. But it should be understood that the bolt post 23 may be modified to have any other configuration. The bolt post 23 is adapted to be connected to an extension rod of a shelf or a support frame. However, since such connection is not essential to the technical features of the present invention, a detailed description thereof is dispensed with.

The clamping plate 3 is an integrally formed plate, preferably of metal. The clamping plate 3 includes a bottom clamping portion 31 and a top clamping portion 32, which are connected by a clamping wall 33. The bottom clamping portion 31 in this embodiment is shown to be curved but should not be limited thereto. The top clamping portion 32 is provided with a through hole 321 that is sized to match the clamping rod 21, and has threads for engagement with the threads 211. The clamping wall 33 is substantially perpendicular with respect to the bottom clamping portion 31 and the top clamping portion 32. Therefore, viewed from one side, the clamping plate 3 is substantially C-shaped.

Referring to FIG. 2, during assembly, the clamping rod 21 of the clamping bolt 2 passes through the top hole 12, and screws pass through the depression holes 14 to be locked in the bolt holes 221 to position the clamping bolt 2. The clamping plate 3 is inserted via the lower portion of the clamping body 1, and the through hole 321 screwably engages the clamping rod 21, thereby accomplishing the assembly as shown in FIG. 2, in which the clamping device is in a non-clamping state.

In use, referring to FIG. 3, when the clamping device is adapted to clamp the edge of a desk, the bottom clamping portion 31 is placed below the bottom side of the desk, and the clamping body 1 is rotated so that the clamping rod 21 displaces downwardly along the threads of the through hole 321 of the top clamping portion 32. When the bottom end of the clamping body 1 urges against the desk surface, the clamping device is positioned. At this time, as shown, the clamping wall 33 is perpendicular to and abuts tightly against the edge of the desk. Therefore, the clamping wall 33 will not project from the desk, which is an advantageous effect not present in conventional clamping devices.

Although the present invention has been illustrated and described with reference to the preferred embodiment thereof, it should be understood that it is in no way limited to the details of such embodiment but is capable of numerous modifications within the scope of the appended claims.

What is claimed is:

1. An improved clamping device, comprising:

a clamping body having an open lower portion and a top plate at an upper portion, said top plate being formed with a top hole, a depression being formed at an outer periphery of said top hole and being provided with at least two depression holes;

a clamping bolt having a clamping rod connected to a bolt plate, said bolt plate having an outwardly projecting bolt post, said clamping rod having an outer diameter smaller than an inner diameter of said top hole and being provided with threads, said bolt plate being sized to match said depression and provided with bolt holes corresponding to said depression holes; and a clamping plate including a bottom clamping portion, a top clamping portion, and a clamping wall, each of which is bent in a right-angle, said top clamping portion having a through hole sized to match said clamping rod and being provided with threads corresponding to those of said clamping rod;

whereby said clamping rod passes through said top hole, screws passing through said depression holes and said bolt holes for screwable engagement, so that said clamping body can be rotated to permit adjustment of a distance between an end portion of said clamping body and said bottom clamping portion to adapt to thickness of different clamped objects.

2. The improved clamping device as defined in claim 1, wherein said clamping body is cylindrical and has an outer peripheral wall provided with toothed portions.

3. The improved clamping device as defined in claim 1, wherein said bolt post is centrally formed with a post hole.

* * * * *